United States Patent

[11] 3,602,446

[72] Inventor Kin'ichi Kawashima
Yamato-Machi, Japan
[21] Appl. No. 861,678
[22] Filed Sept. 29, 1969
[45] Patented Aug. 31, 1971
[73] Assignee American Optical Corporation
Southbridge, Mass.

[54] APPARATUS FOR PRODUCING BUNDLES OF OPTICAL FIBERS
2 Claims, 3 Drawing Figs.

[52] U.S. Cl. .................................................. 242/18 R,
242/18 G
[51] Int. Cl. ....................................................... B65h 54/10
[50] Field of Search ............................................ 242/18,
186, 43, 58; 65/2, 11 W; 350/96 B

[56] References Cited
UNITED STATES PATENTS

| | | | |
|---|---|---|---|
| 3,229,925 | 1/1966 | Ballmer | 242/18 G |
| 3,248,063 | 4/1966 | Sheldon et al. | 242/18 G |
| 3,506,208 | 4/1970 | Davy et al. | 242/18 |

*Primary Examiner*—Stanley N. Gilreath
*Attorneys*—William C. Nealon, Noble S. Williams and Robert J. Bird ABSTRACT: Producing bundles of optical fiber my winding successive layers of the fiber in the same direction on winding apparatus. The apparatus includes a winding drum over which the fiber is wound in one spiral direction. A guide roller controls the direction and pitch of spiral winding and a transfer plate picks up and returns the fiber to the same starting position on the drum for the winding of each layer thereof. The transfer plate assumes a position of rest during the winding of each layer of fiber and a magnetic clutch is actuated upon completion of the winding causing the transfer plate to rotate with the drum for picking up and returning the fiber to the starting position. At the starting position, the clutch is released and the transfer plate returns to its position of rest by inertia, breaking the length of fiber carried thereover away from the fiber windings on the drum.

PATENTED AUG 31 1971 3,602,446

INVENTOR
KIN'ICHI KAWASHIMA

BY
ATTORNEY 3,602,446

APPARATUS FOR PRODUCING BUNDLES OF OPTICAL FIBERS

BACKGROUND OF THE INVENTION

1. Field of the Invention

Fiber optics with particular reference to apparatus for producing bundles of optical fiber.

2. Description of the Prior Art

In the production of bundles of optical fiber intended to be used as image-transmitting devices, there is the requirement that corresponding opposite ends of fibers in the bundle be arranged in identical geometrical patterns so that images emitted from such devices will be substantially geometrically identical to the images received thereby.

While prior art fiber-winding techniques and apparatuses such as are illustrated in U.S. Pat. No. 3,033,731, for example, have relieved manufacturers of many tedious and time-consuming hand packing and aligning operations, there still remains a need for a more expeditious manner of forming spiral wound multilayer optical fiber bundles wherein the spiral directions of all layers are the same.

In its relationship to apparatus for making fiber optic bundles, the present invention avoids the troublesome and time-consuming multiplicity of operations currently involved in the manufacture of image-transmitting bundles of optical fiber by making it possible to wind a complete multilayer bundle of fiber in one continuous operation with all convolutions of the fiber having the same spiral direction.

SUMMARY OF THE INVENTION

According to the present invention, optical image-transmitting bundles formed of layers of fiber convolutions all having the same spiral direction are produced in large quantities in an uninterrupted, high speed operation from a continuous optical fiber. This is accomplished with apparatus including a winding drum over which the fiber is wound in one spiral direction and picked up by a cylindrical transfer plate which returns the fiber to the starting position of the initial winding on the drum. At this point the fiber begins another winding on the drum over the previous winding in the same spiral direction, and so on, until a desired number of layers of wound fiber are produced. A guide roller controls the direction and pitch of spiral winding.

The transfer plate, being spaced from the drum, assumes an out of the way position of rest during the winding of each layer of fiber and is actuated by a magnetic clutch so as to rotate coaxially with the winding drum upon the completion of the winding of each layer of fiber. In so rotating with the winding drum, the transfer plate picks up the fiber and guides the same back to the starting position for winding. At this starting position, the clutch is released allowing the transfer plate to return to its normal position of rest by inertia causing the length of fiber carried thereover to be broken away from the fiber windings on the drum. The foregoing winding operation is continued without interruption until a desired number of layers of fiber are produced, all having the same spiral direction.

DESCRIPTION OF THE PREFERRED EMBODIMENTS

Figure 1:
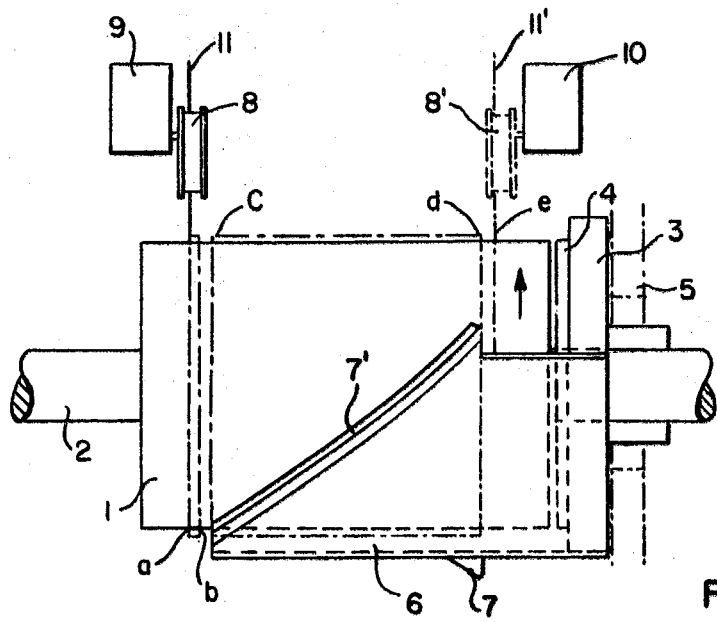
FIG. 1 is a diagrammatic illustration, in elevation, of a preferred embodiment of this invention.
Figure 2:
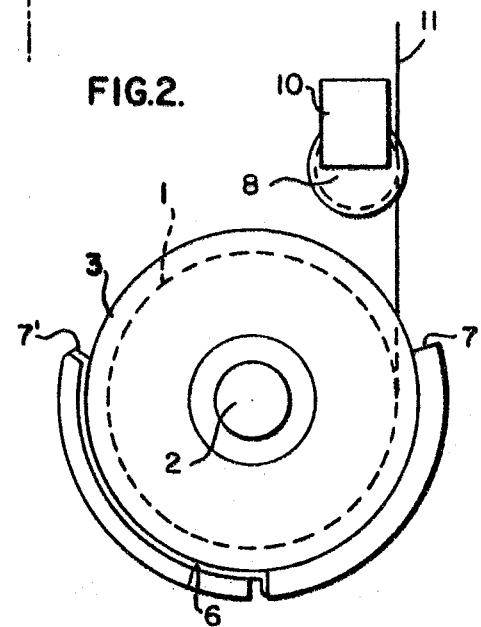
FIG. 2 is a diagrammatic end view of the apparatus shown in FIG. 1.

Referring more particularly to FIGS. 1 and 2, the fiber-winding apparatus illustrated therein includes a winding drum 1 fixed to drive shaft 2 upon which is mounted disc 3 being freely rotatable independently of drum 1 about shaft 2. Clutch plate 4 fixed to shaft 2 has a sliding fit against disc 3 so as to normally rotate with drum 1 without carrying disc 3 along with it. Disc 3 and plate 4 make up an electromagnetic clutch which when energized, electromagnetically clamps the two together for rotation with drum 1. Stop member 5, having a sliding friction fit against disc 3 holds the disc stationary in the position of rotational orientation shown in FIGS. 1 and 2 when the magnetic clutch is not energized.

A cylindrical fiber transfer plate 6 having outwardly projecting spiral guide member 7 and 7' is fixed to disc 3 for rotation therewith when the electromagnetic clutch is energized whereby a length of fiber having been wound along drum 1 is transferred to the starting point of the winding thereof. Roller 8 moveable back and forth in directions parallel to the axis of drum 1 feeds optical fiber 11 to the drum and controls the direction and pitch of spiral winding thereof in the usual manner.

Figure 3:
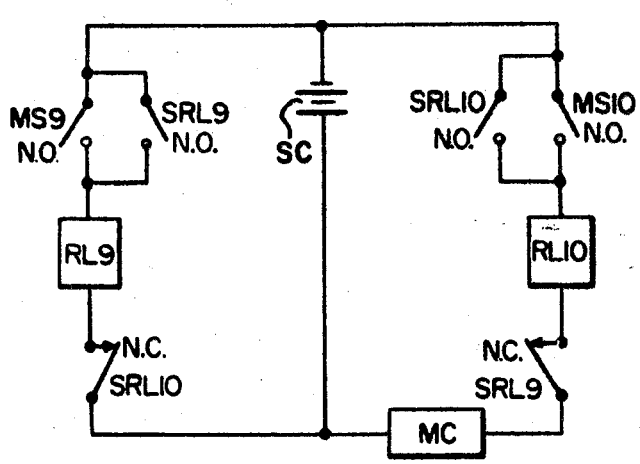
FIG. 3 is a schematic illustration of a type of electrical circuit useful in controlling the operation of the apparatus illustrated in FIGS. 1 and 2.

Microswitches 9 and 10 adjacent respective opposite ends of drum 1 which are adapted to be engaged and actuated by roller 8, function through appropriate electrical circuitry such as that shown in FIG. 3 to energize and deenergize the electromagnetic clutch at appropriate times during the winding of fiber 11 according to principles of this invention.

Referring more particularly to FIG. 3, it will be noted that microswitches 9 and 10 are each of the normally open double-pole type wherein MS 9 and MS 10 respectively represent the poles thereof where are actuated by roller 8. SRL 9 and SRL 10 represent the poles of switches which are operated by relays RL 9 and RL 10. The electromagnetic clutch MC (plate 4 and disc 3) is supplied by current from source SC and is energized by the closing of switch SRL 10 of microswitch 10. It is deenergized by the closing of switch SRL 9 of microswitch 9 which activates relay RL 9.

In operation, a first layer of fiber 11 is wound from position $c$ to position $d$ on drum 1 during which time all switches in the circuit of FIG. 3 are in their illustrated normal position. Upon continuing the winding to position $e$ (FIG. 1), roller 8 engages microswitch 10 as indicated by dot-dash outline 8'. This closes switch MS 10 (FIG. 3), energizing relay RL 10 which closes normally open switch SRL 10 and opens the normally closed switch SRL 10. Magnetic clutch MC, now being energized, causes plate 6 to rotate with drum 1 whereby plate 6 picks up fiber 11 in the position 11' thereof and roller 8 is quickly returned to its starting position $c$. In so doing fiber 11 is guided by spiral projections 7 and 7' back to the starting position $c$ of the first wound layer thereof on drum 1. Roller 8 is continued toward microswitch 9 until making contact therewith whereupon the closing of switch MS 9 activates relay RL 9 causing the normally open switch SRL 9 to close and the normally closed switch SRL 9 to open. The latter deenergizes magnetic clutch MC and relay RL 10 whereby switch SRL 10 returns to its normal open position. Fiber 11 is then returned to the position $b$ (FIG. 1) by movement of roller 8 theretoward and then to position $c$ for the winding of a second layer of fiber in the same spiral direction over the first layer thereof.

The above-described movement of roller 8 bringing fiber 11 from position $c$ through position $b$ to position $a$ and back through position $b$ to position $c$ prevents entanglement or loosening of the fiber 11 on drum 1 when the length thereof having passed over plate 6 is broken away from the fiber winding by release of the magnetic clutch. Release of the magnetic clutch causes plate 6 to continue its rotation by inertia an amount sufficient to return to its initial position of rest where it is held by stop means 5.

Fiber 11 having now reached the position $c$ on drum 1 through the course of positions $b$–$a$–$b$ is ready for the next winding of a layer of fiber in the same spiral direction toward position $d$. Thereafter, the foregoing winding procedure is repeated a number of times sufficient to produce a desired number of wound layers of fiber on drum 1 all having the same spiral directions.

Convolutions of the windings may be cemented or otherwise secured together, removed from the drum as a unit and cut or otherwise prepared for their intended use.

I claim:
1. Optical fiber winding apparatus comprising:
a fiber winding drum;
a drive shaft upon which the drum is mounted for rotation by said shaft;
a disc and clutch plate mounted on said shaft adjacent one end of the drum, said disc being independently rotatable about said shaft and said plate being fixed for rotation with said shaft;
means for selectively electromagnetically clamping said disc and plate together for rotation in unison;
a fiber transfer plate fixed to said disc and extending along said drum in spaced parallel relationship therewith;
stop means adjacent said disc for restricting rotation thereof when said disc and plate are released from said magnetic clamping; and
a guide roller spaced from said drum, said roller being moveable back and forth in directions parallel to the length of said drum for receiving and guiding a fiber back and forth along said drum for spiral winding thereof on said drum.

2. Apparatus according to claim 1 including electrical switching and current-supplying circuitry for operating said electromagnetic clamping means.